United States Patent
Morizur et al.

(10) Patent No.: US 9,896,581 B2
(45) Date of Patent: *Feb. 20, 2018

(54) COMPOSITIONS AND ARTICLES OF MANUFACTURE CONTAINING BRANCHED POLYCARBONATE

(71) Applicant: SABIC GLOBAL TECHNOLOGIES B.V., Bergen Op Zoom (NL)

(72) Inventors: Jean-Francois Morizur, Evansville, IN (US); Thomas L. Evans, Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,172

(22) Filed: Feb. 26, 2016

(65) Prior Publication Data

US 2016/0177090 A1 Jun. 23, 2016

Related U.S. Application Data

(63) Continuation of application No. 13/913,906, filed on Jun. 10, 2013, now Pat. No. 9,315,666, which is a continuation of application No. 12/945,866, filed on Nov. 14, 2010, now Pat. No. 8,461,249.

(51) Int. Cl.
| | |
|---|---|
| *C08L 69/00* | (2006.01) |
| *C08G 64/14* | (2006.01) |
| *C08K 5/00* | (2006.01) |
| *C08K 5/42* | (2006.01) |
| *C08K 5/549* | (2006.01) |

(52) U.S. Cl.
CPC .............. *C08L 69/00* (2013.01); *C08G 64/14* (2013.01); *C08K 5/0066* (2013.01); *C08K 5/42* (2013.01); *C08K 5/549* (2013.01); *C08L 2201/02* (2013.01); *C08L 2201/10* (2013.01); *C08L 2205/025* (2013.01)

(58) Field of Classification Search
CPC .............................. C08K 5/0066; C08L 69/00
See application file for complete search history.

(56) References Cited

U.S. PATENT DOCUMENTS

| | | | |
|---|---|---|---|
| 4,185,009 | A | 1/1980 | Idel et al. |
| 5,357,028 | A | 10/1994 | Pakull et al. |
| 6,596,840 | B1 | 7/2003 | Kratschmer et al. |
| 6,706,797 | B1 | 3/2004 | Ebert et al. |
| 7,696,297 | B2 | 4/2010 | Schultz et al. |
| 8,461,249 | B2 | 6/2013 | Morizur et al. |
| 2003/0105226 | A1 | 6/2003 | Cella et al. |
| 2009/0197999 | A1 | 8/2009 | Shen et al. |
| 2009/0318629 | A1 | 12/2009 | Adoni et al. |
| 2009/0326183 | A1 | 12/2009 | Schultz et al. |
| 2013/0274392 | A1 | 10/2013 | Morizur et al. |
| 2013/0310498 | A1 | 11/2013 | Morizur et al. |

FOREIGN PATENT DOCUMENTS

| | | |
|---|---|---|
| WO | 2008060714 A2 | 5/2008 |
| WO | 2012065039 A1 | 5/2012 |

OTHER PUBLICATIONS

Ghasemi et al.; "QSPR Study for Estimation of Acidity Constants of Some Aromatic Acids Derivatives Using Multiple Linear Regression (MLR) Analysis"; Journal of Molecular Structure: THEOCHEM; vol. 805; 2007; pp. 27-32.
International Search Report; International Application No. PCT/US2011/060326; International Filing Date: Nov. 11, 2011; dated Feb. 8, 2012; 4 Pages.
Liptak et al.; "Absolute pKa Determinations for Substituted Phenols"; J. Am. Chem. Soc.; vol. 124; 2002; pp. 6421-6427.
Naeemi et al.; "An Improved Method for Determination of Light Hydrocarbons in Stabilized Crude Oil"; Chromatographia; vol. 39; No. 5/6; Sep. 1994; pp. 363-365.
Non-Final Office Action dated May 27, 2015; U.S. Appl. No. 13/913,906, filed Jun. 10, 2013; 9 pages.
Written Opinion of the International Searching Authority; International Application No. PCT/US2011/060326; International Filing Date: Nov. 11, 2011; dated Feb. 8, 2012; 9 Pages.

*Primary Examiner* — Wenwen Cai
(74) *Attorney, Agent, or Firm* — Cantor Colburn LLP

(57) ABSTRACT

A polycarbonate containing composition comprising a peak melt viscosity of at least 8,000 poise when measured using a parallel plate melt rheology test at a heating rate of 10° C./min at a temperature of between about 350° C. to about 450° C., and wherein a molded article of the composition has a UL 94 V0 rating at a thickness of 1.0 mm, 1.5 mm, 2.0 mm, or between 1.0 mm and 2.0 mm is disclosed.

19 Claims, 1 Drawing Sheet

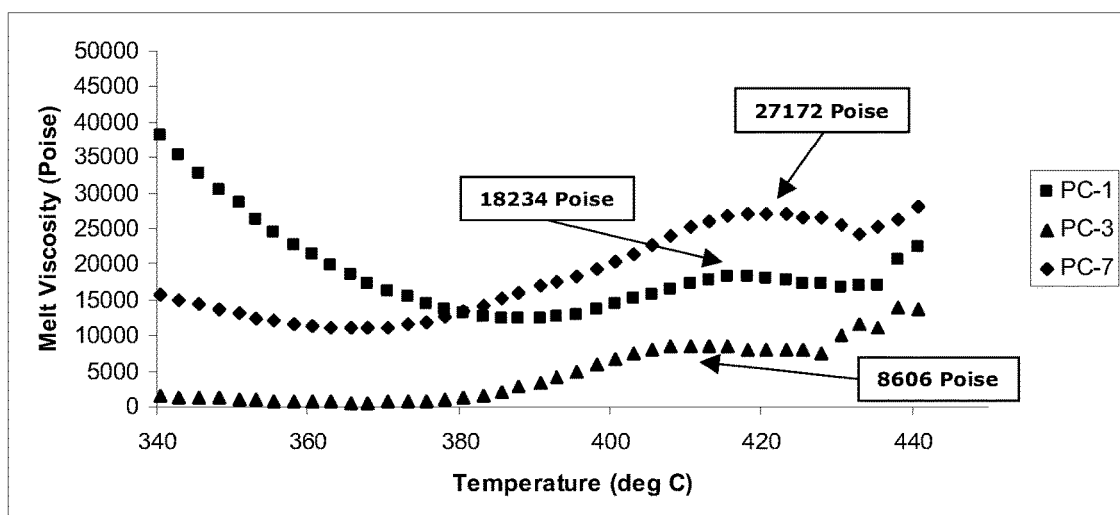

COMPOSITIONS AND ARTICLES OF MANUFACTURE CONTAINING BRANCHED POLYCARBONATE

CROSS REFERENCE TO RELATED APPLICATIONS

This application is a continuation of U.S. patent application Ser. No. 13/913,906, filed Jun. 10, 2013, which is a continuation of U.S. patent application Ser. No. 12/945,866, filed Nov. 14, 2010, both of which are incorporated herein in their entirety by reference.

FIELD OF THE INVENTION

This disclosure relates to polycarbonate compositions and in particular to endcapped polycarbonate compositions, methods of manufacture, and uses thereof.

BACKGROUND OF THE INVENTION

Polycarbonate is a high-performance plastic with good impact strength (ductility). However, polycarbonate often has relatively limited flow properties, which is needed in the manufacture of thin walled articles. Medium to high flow polycarbonate grades suffer from the fact that the low temperature ductility is sacrificed for a better flow. Furthermore, polycarbonate compositions often require the use of flame-retardants to find successful use in the manufacture of a variety of articles and components.

There accordingly remains a need in the art for high flow polycarbonate compositions and articles made from them that are transparent and flame retardant to levels acceptable by industry and in particular for thin-walled 25,000 poise applications, e.g. molded articles with 1.5 mm thickness.

SUMMARY OF THE INVENTION

The present invention provides for a composition comprising: a polycarbonate, wherein the polycarbonate comprises a repeating structural backbone of the following formula

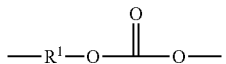

wherein at least 60 percent of the total number of $R^1$ groups contain aromatic groups and the balance thereof are aliphatic or alicyclic groups; wherein the polycarbonate was formed in the presence of an end-capping agent and the end-capping agent is not cyanophenol; wherein the polycarbonate has a branching level of at least about 2%; and wherein the polycarbonate has a peak melt viscosity of at least 25,000 poise when measured using a parallel plate melt rheology test at a heating rate of 10° C./min at a temperature of between about 350° C. to about 450° C. at a frequency of 3 rad/s and strain amplitude of 9%; and wherein a molded article of the polycarbonate has a UL94 V0 rating at a thickness of 1.0 mm; a flame retardant; and a thermoplastic polymer that is different than the polycarbonate; and wherein a molded article of the composition has a UL94 V0 rating at a thickness of 1.5 mm.

In an embodiment, a method of making a composition, comprises: preparing a polycarbonate by selecting a branching level, a desired weight average molecular weight, and an end-capping agent such that the polycarbonate has a calculated peak melt viscosity of at least 25,000 poise as calculated by a peak melt viscosity equation as follows:

calculated peak melt viscosity=$-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein BL is determined by dividing a number of moles of branching agent by a total moles of bisphenol from which the polycarbonate is derived, the MW is the weight-averaged molecular weight of the polycarbonate as determined by gel permeation chromatography using polycarbonate standards, and the pKa is the pKa of the end capping agent; and reacting bisphenol, end-capping agent, branching agent, and a carbonate precursor wherein the polycarbonate has a repeating structural backbone of the following formula

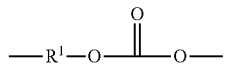

wherein at least 60 percent of the total number of $R^1$ groups contain aromatic groups and the balance thereof are aliphatic or alicyclic groups; wherein the end-capping agent is not cyanophenol; wherein the pKa of the end-capping agent is from about 8.3 to about 11; and wherein a molded article of the polycarbonate has a UL94 V0 rating at a thickness of 1.0 mm; and blending with the polycarbonate a flame retardant and a thermoplastic polymer different than the polycarbonate; wherein a molded article of the composition has a UL94 V0 rating at a thickness of 1.5 mm.

In an embodiment, a method of making an article of manufacture, comprises: preparing a polycarbonate by selecting a branching level, BL, a desired weight average molecular weight, and an end-capping agent such that the polycarbonate has a calculated peak melt viscosity of at least 25,000 poise is calculated by a peak melt viscosity equation as follows:

calculated peak melt viscosity=$-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein BL is determined by dividing a number of moles of branching agent by a total moles of bisphenol from which the polycarbonate is derived, the MW is the weight-averaged molecular weight of the polycarbonate as determined by gel permeation chromatography using polycarbonate standards, and the pKa is the pKa of the end capping agent; reacting the bisphenol, the end-capping agent, the branching agent, and a carbonate precursor, wherein the polycarbonate comprises a repeating structural backbone of the following formula

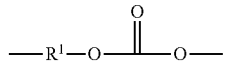

wherein at least 60 percent of the total number of $R^1$ groups contain aromatic groups and the balance thereof are aliphatic or alicyclic groups; wherein the end-capping agent that is not cyanophenol; wherein an article made from the polycarbonate has a UL94 V0 rating at a thickness of 1.0 mm; blending with the polycarbonate a flame retardant and a thermoplastic polymer different than the polycarbonate to form the composition; and forming the composition into the article; wherein an article made from the composition has a UL94 V0 rating at a thickness of 1.5 mm.

In a further embodiment, the peak melt viscosity is at least 25,000 poise calculated from the above equation.

BRIEF DESCRIPTION OF DRAWINGS

FIG. 1 is a graphical representation of temperature sweep data for four different polycarbonates containing different end-capping agents, branching levels and MW (weight average molecular weight) values. The plots were obtained using a dynamic rheometric test with parallel plates fixture. Peak Melt Viscosity values were obtained using these and similar plots.

DETAILED DESCRIPTION OF THE INVENTION

The word "about" should be given its ordinary and accustomed meaning and should be relative to the word or phrase(s) that it modifies. In the context of pKa, the word "about" as it pertains to pKa can equal the value of the numeric or can equal in the range of +/−0.1 of the pKa unit, e.g. pKa of about 8.3 can include 8.2, and the word "about" as it pertains to branching level can equal the value of the numeric or can equal in the range +/−0.05% of the branching level, e.g. about 1% can encompass 0.95%. The delineation of the word about in the context pKa and branching level should not in any way limit the ordinary and accustomed meaning of the word "about" for other language/numerics that the word "about" modifies.

Polycarbonate standard means polycarbonate resins whose molecular weights are considered reliable and verified by a variety of analytical methods. These are used to calibrate the gel permeation chromatograph molecular weight determination method.

As stated above, the present invention provides for a composition comprising: a flame retardant; a polycarbonate, wherein the polycarbonate has a repeating structural background of the following formula

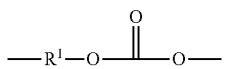

wherein at least 60 percent of the total number of $R^1$ groups contain aromatic organic groups and the balance thereof are aliphatic, alicyclic, or aromatic groups; wherein the polycarbonate comprises an end-capping agent and the end capping agent is not cyanophenol; wherein the polycarbonate comprises said branching agent and said end-capping agent and said composition has a peak melt viscosity of at least 8,000 poise when measured using a parallel plate melt rheology test at a heating rate of 10° C./min at a temperature of between about 350° C. to about 450° C.; and wherein a molded article of the composition has a UL 94 V0 rating at a thickness of 1 mm, 1.5 mm, 2.0 mm, or between 1.0 mm and 2.0 mm.

A. Polycarbonate Material/Structural Backbone of Said Composition

Various types of polycarbonates that have a repeating structural background of the following formula:

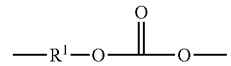

can be utilized for the claimed invention/inventions encompassed by this disclosure.

The selection of a polycarbonate backbone of choice depends on many factors such as end use and other factors understood by one of ordinary skill the art.

In one embodiment, the polycarbonates have repeating structural carbonate units of the formula (1):

(1)

wherein at least 60 percent of the total number of $R^1$ groups contains aromatic organic groups and the balance thereof are aliphatic, alicyclic, or aromatic groups.

In another embodiment, the polycarbonate is derived from bisphenol-A.

In another embodiment, each $R^1$ group is a divalent aromatic group, for example derived from an aromatic dihydroxy compound of the formula (3):

$$HO\text{-}A^1\text{-}Y^1\text{-}A^2\text{-}OH \tag{3}$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (3) are bisphenol compounds of general formula (4):

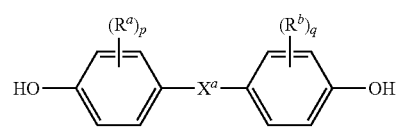

(4)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5) or (6):

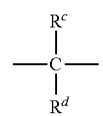

(5)

(6)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (7):

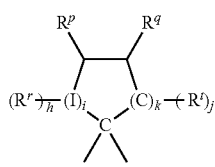
(7)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (7) will have an unsaturated carbon-carbon linkage where the ring is fused. When k is 1 and i is 0, the ring as shown in formula (7) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (8):

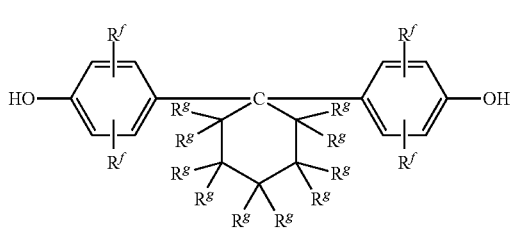
(8)

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (9):

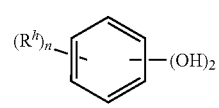
(9)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9 to bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units. In one specific embodiment, the polycarbonate is a linear homopolymer or copolymer comprising units derived from bisphenol A, in which each of $A^1$ and $A^2$ is p-phenylene and $Y^1$ is isopropylidene in formula (3). More specifically, at least 60%, particularly at least 80% of the $R^1$ groups in the polycarbonate are derived from bisphenol A.

Another specific type of copolymer is a polyester carbonate, also known as a polyester-polycarbonate. Such copolymers further contain, in addition to recurring carbonate chain units of the formula (1), repeating units of formula (10):

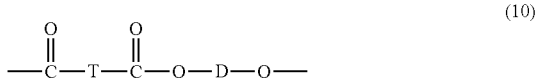

(10)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (4) above. In another embodiment, D is derived from an aromatic dihydroxy compound of formula (9) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

A specific example of a polycarbonate-polyester is a copolycarbonate-polyester-polysiloxane terpolymer comprising carbonate units of formula (1), ester units of formula (10), and polysiloxane (also referred to herein as "polydiorganosiloxane") units of formula (11):

(11)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (11) may vary widely depending on the type and relative amount of each component in the thermoplastic composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 12.

In an embodiment, polydiorganosiloxane units are derived from dihydroxy aromatic compound of formula (12):

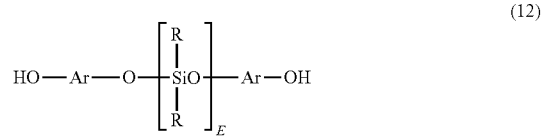

(12)

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (12) may be derived from a $C_{6-30}$ dihydroxy aromatic compound, for example a dihydroxy aromatic compound of formula (3), (4), (8), or (9) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis (4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

In a specific embodiment, where Ar is derived from resorcinol, the polydiorganosiloxane repeating units are derived from dihydroxy aromatic compounds of formula (13):

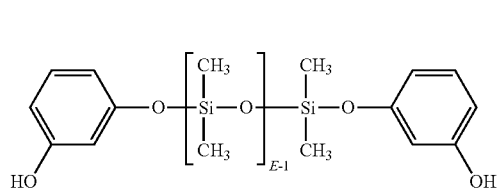

(13)

or, where Ar is derived from bisphenol-A, from dihydroxy aromatic compounds of formula (14):

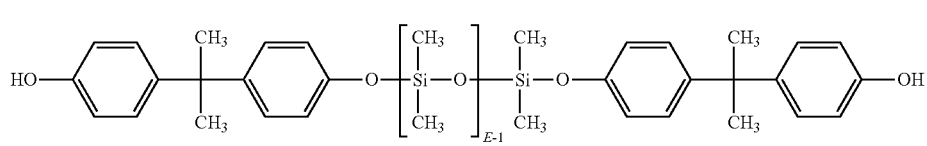

(14)

wherein E is as defined above.

In another embodiment, polydiorganosiloxane units are derived from dihydroxy aromatic compound of formula (15):

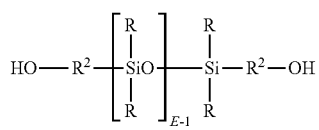

(15)

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are derived from dihydroxy aromatic compound of formula (16):

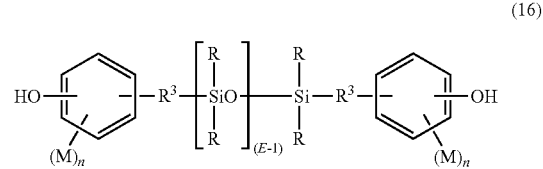

(16)

wherein R and E are as defined above. Each $R^3$ is independently a divalent $C_{2-8}$ aliphatic group. Each M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polydiorganosiloxane units are derived from a dihydroxy aromatic compound of formula (17):

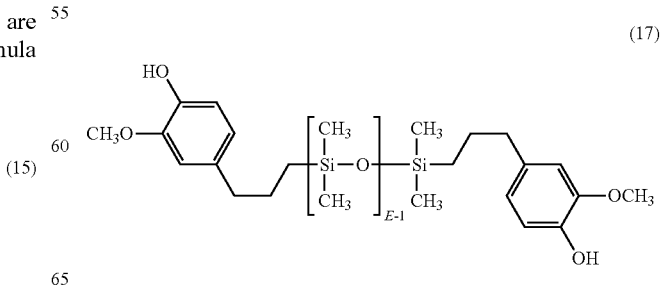

(17)

wherein E is as described above.

In another specific embodiment, the polydiorganosiloxane units are derived from dihydroxy aromatic compound of formula (18):

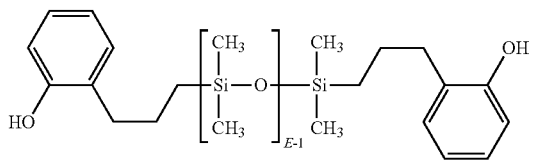

(18)

wherein E is as defined above.

Dihydroxy polysiloxanes typically can be made by functionalizing a substituted siloxane oligomer of formula (19):

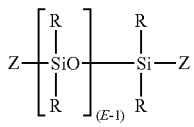

(19)

wherein R and E are as previously defined, and Z is H, halogen (Cl, Br, I), or carboxylate. Exemplary carboxylates include acetate, formate, benzoate, and the like. In an exemplary embodiment, where Z is H, compounds of formula (19) may be prepared by platinum catalyzed addition with an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (3), (4), (8), (9), or a combination comprising at least one of the foregoing dihydroxy aromatic compounds. In an exemplary embodiment, compounds of formula (12) may be formed from an alpha, omega-bisacetoxypolydiorangonosiloxane and a dihydroxy aromatic compound under phase transfer conditions.

Specific copolycarbonate terpolymers include those with polycarbonate units of formula (1) wherein $R^1$ is a $C_{6-30}$ arylene group, polysiloxane units derived from siloxane diols of formula (14), (17) or (18), and polyester units wherein T is a $C_{6-30}$ arylene group. In an embodiment, T is derived from isophthalic and/or terephthalic acid, or reactive chemical equivalents thereof. In another embodiment, $R^1$ is derived from the carbonate reaction product of a resorcinol of formula (9), or a combination of a resorcinol of formula (9) and a bisphenol of formula (4).

The relative amount of each type of unit in the foregoing terpolymer will depend on the desired properties of the terpolymer, and are readily determined by one of ordinary skill in the art with out undue experimentation, using the guidelines provided herein. For example, the polycarbonate-polyester-polysiloxane terpolymer can comprise siloxane units in an amount of 0.1 to 25 weight percent (wt. %), specifically 0.2 to 10 wt. %, more specifically 0.2 to 6 wt. %, even more specifically 0.2 to 5 wt. %, and still more specifically 0.25 to 2 wt. %, based on the total weight of the polycarbonate-polyester-polysiloxane terpolymer, with the proviso that the siloxane units are provided by polysiloxane units covalently bonded in the polymer backbone of the polycarbonate-polyester-polysiloxane terpolymer. The polycarbonate-polyester-polysiloxane terpolymer can further comprise 0.1 to 49.85 wt. % carbonate units, 50 to 99.7 wt. % ester units, and 0.2 to 6 wt. % polysiloxane units, based on the total weight of the polysiloxane units, ester units, and carbonate units. Alternatively, the polycarbonate-polyester-polysiloxane terpolymer comprises 0.25 to 2 wt. % polysiloxane units, 60 to 96.75 wt. % ester units, and 3.25 to 39.75 wt. % carbonate units, based on the total weight of the polysiloxane units, ester units, and carbonate units.

Various types of thermoplastic compositions are encompassed by the claimed invention/inventions encompassed by this disclosure.

In one embodiment, the polycarbonate is selected from at least one of the following: a homopolycarbonate derived from a bisphenol; a copolycarbonate derived from more than one bisphenol; and a copolymer derived from one or more bisphenols and having one or more aliphatic ester units or aromatic ester units or siloxane units.

In another embodiment, in addition to the endcapped polycarbonates described above, the thermoplastic compositions can also comprise other thermoplastic polymers, for example polyesters, polyamides, and other polycarbonate homopolymers and copolymers, including polycarbonate-polysiloxane copolymers and polyester carbonates, also known as a polyester-polycarbonates, and polyesters. The polymer component of such compositions can comprise 1 to 99 wt. %, specifically 10 to 90 wt. %, more specifically 20 to 80 wt. % of the cyanophenyl endcapped polycarbonate, with the remainder of the polymer component being other polymers.

In another embodiment, a second polycarbonate is formulated with the composition, wherein a second polycarbonate comprises a repeating structure of

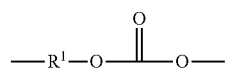

wherein said second polycarbonate is different from said polycarbonate and wherein at least 60 percent of the total number of $R^1$ groups contain aromatic organic groups and the balance thereof are aliphatic, alicyclic, or aromatic groups.

In another embodiment, the second polycarbonate is derived from bisphenol-A.

B. Branching Agents

The polycarbonates of the claimed invention contain branched polycarbonate(s). Various types of branching agents can be utilized for the claimed invention/inventions encompassed by this disclosure.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent and may lead to viscosity problems during phosgenation. Therefore, in some embodiments, an increase in the amount of the chain termination agent is used in the polymerization. The amount of chain termination agent used when the particular branching agent is used is generally higher than if only a chain termination agent alone is used. The amount of chain termination agent used is generally above 5 mole percent and less than 20 mole percent compared to the bisphenol monomer.

In some embodiments, the branching agent is a structure derived from a triacid trichloride of the formula (21)

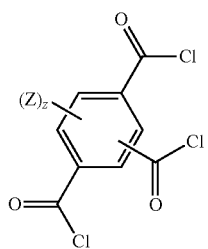

(21)

wherein Z is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (22)

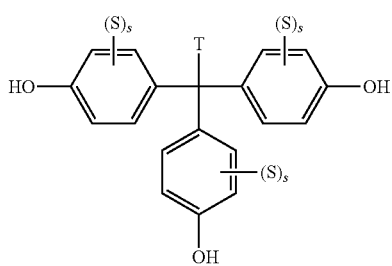

(22)

wherein T is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (23)

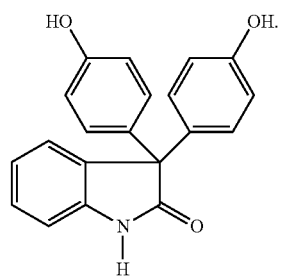

(23)

Examples of specific branching agents that are particularly effective in the compositions include trimellitic trichloride (TMTC), tris-p-hydroxy phenyl ethane (THPE) and isatin-bis-phenol. In one embodiment, in formula (21), z is hydrogen and z is 3. In another embodiment, in formula (22), S is hydrogen, T is methyl and s is 4.

The relative amount of branching agents used in the manufacture of the polymer will depend on a number of considerations, for example the type of $R^1$ groups, the amount of cyanophenol, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 $R^1$ units. For branching agents having formula (21), the amount of branching agent tri-ester groups are present in an amount of about 0.1 to 10 branching units per 100 $R^1$ units, specifically about 0.5 to 8 branching units per 100 $R^1$ units, and more specifically about 0.75 to 5 tri-ester units per 100 $R^1$ units. For branching agents having formula (22), the amount of branching agent tricarbonate groups are present in an amount of about 0.1 to 10 branching units per 100 $R^1$ units, specifically about 0.5 to 8 branching units per 100 $R^1$ units, and more specifically about 0.75 to 5 triphenylcarbonate units per 100 $R^1$ units. In some embodiments, a combination of two or more branching agents may be used.

In one embodiment, the polycarbonate of said composition has a branching level of at least about 1% or at least about 2% or at least about 3% or from about 1% to about 3%.

C. End-Capping Agents

Various types of end-capping agents can be utilized for the claimed invention/inventions encompassed by this disclosure.

In one embodiment, the end-capping agent is selected based upon the molecular weight of said polycarbonate and said branching level imparted by said branching agent. The desired goal is achieve a thin walled article with good flame retardance, e.g. a composition wherein a molded article of the composition has a UL 94 V0 rating at a thickness of 1 mm, 1.5 mm, 2.0 mm, or between 1.0 mm and 2.0 mm.

Without being bound by theory, the pKa of the end-capping agent is of importance in achieving a thin-walled article of manufacture with a V0 rating. The pKa of an end-capping agent is a measure of its relative acidity. The lower the pKa value of the end-capping agent the more acidic the end-capping agent. It was unexpectedly observed that the pKa of an end-capping agent is one indicator of the flame retardancy of the branched polycarbonate. For example lower pKas provide better flame retardant properties than higher pKas for branched polycarbonates.

In one embodiment, the end-capping agent has a pKa between about 8.3 and about 11. In a further embodiment, the end-capping agent has a pKa of between 9 and 11.

In another embodiment, the end-capping agents are selected from at least one of the following: phenol or a phenol containing one or more substitutions with at least one of the following: aliphatic groups, olefinic groups, aromatic groups, halogens, ester groups, and ether groups.

Of particular usefulness commercially, in another embodiment, the end-capping agents are selected from at least one of the following: phenol, para-t-butylphenol or para-cumylphenol.

D. Additives for End-Capped Polycarbonate Compositions

Various types of flame retardants can be utilized in the claimed invention/inventions encompassed by this disclosure.

In one embodiment, the flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS, alone or in combination with other flame retardants, are particularly useful in the polycarbonate compositions disclosed herein.

In another embodiment, the flame-retardants are selected from at least one of the following: alkali metal salts of perfluorinated $C_{1-16}$ alkyl sulfonates; potassium perfluorobutane sulfonate; potassium perfluoroctane sulfonate; tetraethylammonium perfluorohexane sulfonate; and potassium diphenylsulfone sulfonate.

In another embodiment, the flame retardant is not a bromine or chlorine containing composition.

In another embodiment, the flame retardant additives include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful, for example, compounds of the formulas below:

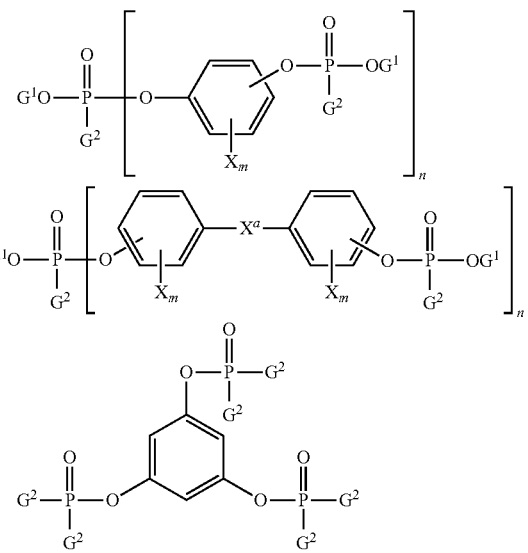

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl) phosphine oxide.

Halogenated organic flame retardant compounds can also be used as flame retardants, for example halogenated flame retardant compounds of formula (20):

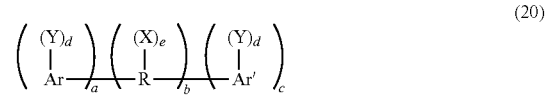

(20)

wherein R is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (20) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R_2SiO)_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt. %, more specifically 0.02 to 5 wt. %, based on 100 parts by weight of the polymer component of the thermoplastic composition.

In another embodiment the thermoplastic composition can further include an impact modifier(s), with the proviso that the additives are selected so as to not significantly adversely affect the desired properties of the thermoplastic composition. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a glass transition temperature ($T_g$) less than 10° C., more specifically less than −10° C., or more specifically −40 to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate. As used herein, the term "(meth)acrylate" encompasses both acrylate and methacrylate groups.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers, when present, are generally present in amounts of 1 to 30 wt. %, based on 100 parts by weight of the polymer component of the thermoplastic composition.

In addition to the endcapped polycarbonate and flame retardant (and any impact modifier, if used), the thermoplastic composition can include various additives ordinarily incorporated in polycarbonate compositions of this type, with the proviso that the additives are selected so as to not significantly adversely affect the desired properties of the polycarbonate, for example, transparency and flame retardance. Combinations of additives can be used. Such additives can be mixed at a suitable time during the mixing of the components for forming the composition.

Various additives can be incorporated into the composition of matters encompassed by this disclosure/claimed invention.

In one embodiment, one or more additives are selected from at least one of the following: UV stabilizing additives, thermal stabilizing additives, mold release agents, colorants, organic and inorganic fillers, and gamma-stabilizing agents.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the composition.

Exemplary antioxidant additives include, for example, organophosphites such as tris(nonyl phenyl)phosphite, tris (2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weigh of the polymer component of the thermoplastic composition (excluding any filler).

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the polymer component of the thermoplastic composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 parts by weight, based on 100 parts by weight of the polymer component of the thermoplastic composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3, 3-diphenylacryloyl)oxy]methyl] propane (UVINUL® 3030); 2,2'-(1,4-phenylene) bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 part by weight, based on 100 parts by weight of the polymer component of the thermoplastic composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or poly-functional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 parts by weight, more specifically 0.1 to 0.5 parts by weight, based on 100 parts by weight of the polymer component of the thermoplastic composition.

The term "antistatic agent" refers to monomeric, oligomeric, or polymeric materials that can be processed into polymer resins and/or sprayed onto materials or articles to improve conductive properties and overall physical performance Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.0001 to 5 parts by weight, based on 100 parts by weight of the polymer component of the thermoplastic composition.

Colorants such as pigment and/or dye additives can also be present provided they do not adversely affect flame retardant performance. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the thermoplastic composition.

Where a foam is desired, useful blowing agents include, for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis(benzenesulfonylhydrazide), sodium bicarbonate, ammonium carbonate, or the like, or combinations comprising at least one of the foregoing blowing agents. Blowing agents are generally used in amounts of 0.01 to 20 parts by weight, based on 100 parts by weight of the polymer component of the thermoplastic composition.

Anti-drip agents can also be used in the thermoplastic composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the polymer component of the thermoplastic composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH2OH) or it can be a member of a more complex hydrocarbon group such as —CR4HOH or —CR24OH wherein R4 is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the thermoplastic composition.

Thermoplastic compositions comprising the endcapped polycarbonates and flame retardants can be manufactured by various methods. For example, endcapped polycarbonate, flame retardant, impact modifier (if present), and/or other optional components are first blended in a HENSCHEL-Mixer® high speed mixer. Other low shear processes, including but not limited to hand mixing, can also accomplish this blending. The blend is then fed into the throat of a single or twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In some embodiments described above, the onset of high-temperature cross-linking can be controlled by adjusting the molecular weight of the endcapped polycarbonate or by the addition of certain flame retardant salts, in particular alkali metal salts of perfluorinated C1-16 alkyl sulfonates. In one embodiment, the addition of an inorganic flame retardant (e.g., KSS) increases the temperature of the onset of cross-linking/branching in the polycarbonate by 20 to 80° C., specifically 40 to 60° C.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals.

E. Polycarbonate Synthesis Processes

Polycarbonates can be manufactured by processes such as interfacial polymerization or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used.

In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make the endcapped polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxyl-phenyl) carbonate, bis(2-acetylphenyl) carboxylate, bis(4-acetylphenyl) carboxylate, or a combination comprising at least one of the foregoing.

It is believed that the foregoing amendments fully comply with the Notice to File Corrected Application Papers. Accordingly, reconsideration and withdrawal of the objection is respectfully requested.

If there are any additional charges with respect to this Amendment or otherwise, please charge them to Deposit Account No. 06-1130.

Exemplary transesterification catalysts for making polycarbonate using a melt process include acetates, carbonates, borates, borohydrides, oxides, hydroxides, hydrides, and alcoholates of various metals including alkali metals such as lithium, sodium, and potassium, alkali earth metals such as magnesium, calcium and barium and other metals such as zinc, cadmium, tin, antimony, lead, manganese cobalt, or nickel. In addition, other useful transesterification catalysts include basic salts of nitrogen or phosphorus such as tetra-butylammonium hydroxide, methyltributylammonium hydroxide, tetrabutylammonium acetate, tetrabutylphosphonium hydroxide, tetrabutylphosphonium acetate, tetrabutylphosphonium phenolate. Combinations of at least one of the foregoing are also useful.

Protocols may be adjusted so as to obtain a desired product within the scope of this disclosure and this can be done without undue experimentation. The desired product is in one embodiment to achieve a molded article of the composition has a UL 94 V0 rating at a thickness of 1 mm, 1.5 mm, 2.0 mm, or between about 1.0 mm and about 2.0 mm.

In one embodiment, the invention provides a method of making an article of manufacture that has a V0 94 rating at a thickness of between 1.5 and 2 mm: (a) providing a polycarbonate, wherein the polycarbonate has a repeating structural background of the following formula

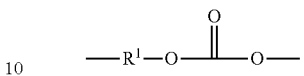

wherein at least 60 percent of the total number of $R^1$ groups contain aromatic organic groups and the balance thereof are aliphatic, alicyclic, or aromatic groups; an end capping agent; a branching agent; (b) selecting the end-capping agent based upon the molecular weight of said polycarbonate and said branching level imparted by said branching agent, wherein the MVR of the polycarbonate is from about 1 to about 15 cubic cm/10 min and wherein the pKa of the end-capping agent is from about 8.3 to about 11; (c) forming a polycarbonate containing said end-capping agent and said branching that has a peak melt viscosity of at least 8,000 poise when measured using a parallel plate melt rheology test at a heating rate of 10° C./min at a temperature of between about 350° C. and about 450° C.; and (d) blending a flame retardant with said formed polycarbonate.

In a further embodiment, the peak melt viscosity is at least 25,000 poise when measured using a parallel plate melt rheology test at a heating rate of 10° C./min at a temperature of between about 350° C. to about 450° C.

In yet another embodiment, the pKa of the end-capping agent is from about 8.3 to about 11.

F. Performance Properties

Achieving excellent flame performance, (UL 94 V0) for thin wall articles (e.g. 2 mm and thinner) made from polycarbonate resins requires achieving short flame out times while preventing flaming drips during UL 94 testing. Short flame out times are usually achieved through the use of flame retardant agents while flaming drips are prevented by adding anti-drip agents such as polytetrafluoroethylene (PTFE). In addition, achieving excellent flame performance for transparent thin wall articles is particularly challenging because anti-drip agents such as PTFE render the article translucent or opaque. Therefore preventing dripping has to be achieved by other means for transparent thin wall articles.

One way to reduce dripping is to increase the molecular weight of the polycarbonate resin but this approach reduces the flow of the resin during molding and so thin wall molds having long flow lengths or intricate designs are difficult to fill without increasing the molding temperature and risking polycarbonate molecular weight degradation and color formation. Branched polycarbonate resins can provide a partial solution to the flow problem because branching provides a means for the polycarbonate chains to entangle, thus reducing dripping without loosing as much flow during molding. However branched polycarbonates with higher levels of branching (1% branching or above) can be difficult to make because when the branching is too high the polycarbonates form gels in the manufacturing process and sometimes during molding. Gels hurt the impact properties and the aesthetics of transparent polycarbonate articles and so highly branched polycarbonates are generally avoided in polycarbonate manufacture and in product formulations.

A certain type of end-group, e.g. p-cyanophenol, attached to the ends of branched polycarbonate chains can also provide anti-dripping benefits during UL testing. Not all branched polycarbonates are formed from p-cyanophenol end-capping agents however.

A general way has been discovered to design polycarbonates by balancing molecular weight, branching level and end-group type to produce transparent polycarbonate formulations that are easily molded into thin wall articles and pass UL 94 V0 testing. This involves measuring the peak melt viscosity of the polycarbonate between 350° C. and 450° C. during a melt rheology test. The "peak melt viscosity" is the highest melt viscosity value (in poise) achieved between 350° C. and 450° C. during rheological testing of a polycarbonate resin.

It has been found that when the peak melt viscosity of a polycarbonate resin containing said branching agent and said end-capping agent is at or above 25,000 poise between 350° C. and 450° C., a molded article made from that resin and a flame retardant additive, consistently passes UL V0 testing at 1.0 mm thickness or above. A polycarbonate resin having a peak melt viscosity of 7,000 poise between 350° C. and 450° C., when formulated with a flame retardant additive, provides a molded article that consistent passes UL V0 testing at 1.5 mm thickness or above.

Furthermore after measuring the peak melt viscosity of many polycarbonate resins having different levels of branching, MW (weight average molecular weight of the polycarbonate containing said end-capping agent and said branching agent) and different types of end-capping agents a relationship has been discovered between the branching level, BL (moles branching agent/moles bisphenol(s)), MW (by GPC using polycarbonate standards) and pKa of the end-capping agent. This relationship is expressed in the following polynomial equation:

Peak Melt Viscosity=$-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$ wherein BL is the mole ratio of branching agent in the formulation determined by dividing the number of moles of branching agent by the total number of moles of bisphenol or bisphenols in the composition, the MW is the weight-averaged molecular weight of the polycarbonate containing said branching agent and said end-capping agent as determined by gel permeation chromatography using polycarbonate standards, and the pKa is the pKa of the end capping agent.

The equation above allows the design of a wide range of polycarbonate resins that will pass UL 94 V0 testing at thin wall thicknesses. Designing the polycarbonate resins involves selecting an end-capping agent and adjusting the MW of the resin and the branching level of the resin in the manufacturing process so that the calculated or measured peak melt viscosity, e.g. has a high value 7000 poise or greater for 1.5 mm or greater and 25,000 poise or greater for 1.0 mm or greater. If the pKa of the end-capping agent has a low value (for example methyl-p-hydroxy benzoate with a pKA of 8) the MW and the amount branching level needed to achieve a UL V0 performance can be lower. If the pKa of the end-capping agent is higher (for example p-t-butylphenol with a pKa of 10.3) then the MW and the branching level will need to be higher. Furthermore after the end-capping agent is selected, a choice can be made between balancing the molecular weight with the level of branching agent in the manufacturing process. The balance between the factors can be done without undue experimentation.

Without being bound by theory the viscosity behavior of the polycarbonate resin containing said branching agent and said end-capping agent as it passes through the temperature range between 350° C. and 450° C. reflects the beginning of the building up of a polymeric network that impacts the dripping behavior of the resin during UL 94 flame testing. Polycarbonate resins that build this network to a higher degree (reflected in a higher peak melt viscosity value in the rheological test) seem to perform better in the UL flame testing at thin walls. The higher the value of the peak melt viscosity the thinner the wall thickness can be for a UL 94 V0 pass.

Surprisingly blending of the polycarbonates with high peak melt viscosities with other polycarbonates also provides blends with excellent flow properties and good FR performance at thin wall thicknesses. The most effective polycarbonates for blending are those polycarbonates that have measured peak measured melt viscosities of 25,000 Poise or a calculated peak melt viscosities of 25,000 Poise or greater. Thus, in one embodiment, a polycarbonate having a weight-averaged MW of 35,526 g/mole and a calculated peak melt viscosity of 23,923 Poise was blended with a second polycarbonate having a weight-average MW of 22,999 g/mole in a 1:1 ratio Rimar Salt flame retardant, octaphenylcyclotetrasiloxane, a heat stabilizer and a mold release agent were also present in the blend. The blend had an MVR of 13.8 (300° C./1.2 kg, 360 s). The blend showed UL-94 V0 rating at 1.5 mm thickness.

In one embodiment, the present invention further provides for a composition comprising: a flame retardant; a polycarbonate, wherein the polycarbonate has a repeating structural background of the following formula

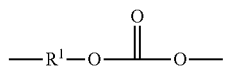

wherein at least 60 percent of the total number of $R^1$ groups contain aromatic organic groups and the balance thereof are aliphatic, alicyclic, or aromatic groups and wherein the polycarbonate contains one or more bisphenols; wherein the polycarbonate comprises an end-capping agent that is not cyanophenol; wherein the polycarbonate comprises a branching agent; and wherein the polycarbonate containing said branching agent and said end-capping agent has a peak melt viscosity of at least 7,000 poise when calculated from the equation of wherein said peak melt viscosity equals: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$, wherein BL is the mole ratio of the branching agent in the formulation determined by dividing the number of moles of branching agent by the total number of moles of bisphenol or bisphenols in the composition, the MW is the weight-averaged molecular weight of said polycarbonate containing said branching agent and said end-capping agent as determined by gel permeation chromatography using polycarbonate standards, and the pKa is the pKa of the end capping agent; and wherein a molded article of the composition has a UL 94 V0 rating at a thickness of 1 mm, 1.5 mm, 2.0 mm, or between about 1.0 mm and about 2.0 mm.

In a further embodiment, the peak melt viscosity is at least 25,000 as calculated by the above equation.

In another embodiment, the present invention further provides for a method of making an article of manufacture that has a V0 94 rating at a thickness of between 1.5 mm and 2 mm: (a) providing a polycarbonate, wherein the polycarbonate has a repeating structural background of the following formula

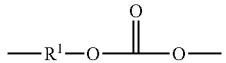

wherein at least 60 percent of the total number of $R^1$ groups contain aromatic organic groups and the balance thereof are aliphatic, alicyclic, or aromatic groups and wherein the polycarbonate contains one or more bisphenols; an end capping agent that is not cyanophenol; a branching agent; (b) selecting the end-capping agent based upon the molecular weight of said polycarbonate and said branching level imparted by said branching agent, wherein the MVR of the polycarbonate is from about 1 to about 15 cubic cm/10 min and wherein the pKa of the end-capping agent is from about 8 to about 11; (c) forming a polycarbonate containing said end-capping agent and said branching agent that has a peak melt viscosity that is at least 7,000 poise when calculated from the equation of wherein said peak melt viscosity equals: $-57135.91+36961.39*BL+14001.13*MW^{1/3}-46944.24*pKa-322.51*BL*MW^{1/3}-2669.19*BL*pKa+215.83*MW^{1/3}*pKa+1125.63*BL^2-200.11*MW^{2/3}+2231.15*pKa^2$; and wherein BL is the mole ratio of the branching agent in the formulation determined by dividing the number of moles of branching agent by the total number of moles of bisphenol or bisphenols in the composition, the MW is the weight-averaged molecular weight of said formed polycarbonate as determined by gel permeation chromatography using polycarbonate standards, and the pKa is the pKa of the end capping agent; and (d) blending a flame retardant with said formed polycarbonate.

In a further embodiment, the peak melt viscosity is at least 25,000 poise calculated from the above equation.

A thin wall article with a good flame-retardance performance is an objective of the claimed disclosure. One way of determining whether a composition of matter has good flame retardant properties is by looking at its UL 94 rating.

In one embodiment, a molded article of the composition has a UL 94 V0 rating at a thickness of 1.5 mm, 2.0 mm, or between 1.0 mm and 2.0 mm.

In another embodiment, a molded article of the composition has a UL 94 V0 rating at a thickness of 2 mm.

In another embodiment, a molded article of the composition has a UL 94 V0 rating at a thickness of 1.5 mm.

In another embodiment, a molded article of the composition has a UL 94 V0 rating at a thickness of 1.0 mm.

In another embodiment, a molded article of the composition has a UL 94 V0 rating at a thickness of between 1.0 mm and 2.0 mm.

Melt volume flow rate (often abbreviated "MVR") measures the rate of extrusion of a thermoplastic through an orifice at a prescribed temperature and load. The endcapped polycarbonates can have an MVR, measured at 300° C. under a load of 1.2 kg, of 0.1 to 200 cubic centimeters per 10 minutes (cm³/10 min), specifically 1 to 100 cm³/10 min MVR was measured by ASTM D 1238.

In one embodiment, the polycarbonate has an MVR of at least about 3 cubic cm/10 min. In a further embodiment, the polycarbonate has an MVR of about 3 to about 30 or about 3 to about 10 cubic cm/10 min or from about 1 to about 15 cubic cm/10 min.

The following polycarbonates encompassed by the claimed invention/disclosure have various haze levels.

In one embodiment, the composition has a haze value of less than 1.5% at 3.2 mm thickness by ASTM D1003.

The molecular weight of the polycarbonate containing said branching and said end-capping agent may vary depending on various end uses or other performance properties.

In one embodiment, the polycarbonate containing said branching agent and end-capping agent is between 20,000 g/mol to 40,000 instead g/mol as measured by gel permeation chromatography using polycarbonate standards.

The following embodiments are also encompassed by the claimed invention.

In one embodiment, the composition A composition comprising: a flame retardant; a polycarbonate, wherein the polycarbonate has a repeating structural background of the following formula

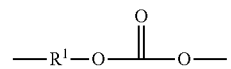

wherein at least 60 percent of the total number of $R^1$ groups contain aromatic organic groups and the balance thereof are aliphatic, alicyclic, or aromatic groups; wherein the polycarbonate comprises an end capping agent selected from phenol, or a phenol substituted with one or more alkyl groups, alkoxy groups, ester groups, ether groups or halogens; wherein the polycarbonate comprises a branching agent selected from at least one of the following THPE, TMTC, and isatin-bis-phenol; wherein the branching level of said polycarbonate is at least about 1%; wherein the molecular weight of said polycarbonate is about 20,000 g/mole to about 40,000 g/mole; wherein the pKa of said end-capping agent is between about 8.3 and about 11; wherein the flame retardant includes a potassium perfluorobutane sulfonate salt and optionally excludes a chlorine or bromine containing composition; wherein the polycarbonate containing said branching agent and said end-capping agent has a peak melt viscosity of at least 8,000 poise when measured using a parallel plate melt rheology test at a heating rate of 10° C./min at a temperature of between about 350° C. and about 450° C.; and wherein a molded article of the composition has a UL 94 V0 rating at a thickness of 1.0, 1.5 mm, 2.0 mm, or between 1.0 mm and 2.0 mm In a further embodiment, the polycarbonate is derived from bisphenol-A.

In yet a further embodiment, the composition comprises a second polycarbonate that is different from the polycarbonate and wherein said second polycarbonate comprises a repeating structure of

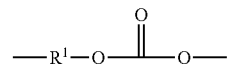

wherein said second polycarbonate is different from said polycarbonate and wherein at least 60 percent of the total number of $R^1$ groups contain aromatic organic groups and the balance thereof are aliphatic, alicyclic, or aromatic groups.

In yet a further embodiment, the second polycarbonate is bisphenol-A polycarbonate.

In another embodiment, a flame retardant that contains a potassium perfluorobutane sulfonate salt greater than about 0.04 wt. % based upon the total weight of polycarbonate resin in the composition; a polycarbonate, wherein the polycarbonate has a repeating structural background of the following formula

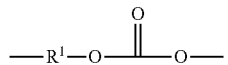

wherein at least 60 percent of the total number of $R^1$ groups contain aromatic organic groups and the balance thereof are aliphatic, alicyclic, or aromatic groups; wherein the polycarbonate comprises an end-capping agent that is not cyanophenol; wherein the polycarbonate comprises a branching agent; wherein the polycarbonate containing said branching agent and said end-capping agent is between 20,000 g/mol and 40,000 g/mol; wherein the MVR of the polycarbonate is from about 3 to about 10 cubic cm/10 min; wherein said branching agent provides a level of branching between about 1% and about 3%; wherein the pKa of the end-capping agent is between about 8.3 and about 10.2; wherein the polycarbonate containing said branching agent and said end-capping agent has a peak melt viscosity of at least 8,000 poise or at least 25,000 poise when measured using a parallel plate melt rheology test at a heating rate of 10° C./min at a temperature of between about 350° C. to about 450° C.; wherein a molded article of the composition has a UL 94 V0 rating at a thickness of 1 mm, 1.5 mm, 2.0 mm, or between 1.0 mm and 2.0 mm; and wherein the haze of the molded article is less than 1.5% at 3.2 mm thickness by ASTM D1003.

All thermoplastic compositions except where indicated were compounded on a Werner & Pfleiderer co-rotating twin screw extruder (Length/Diameter (L/D) ratio=30/1, vacuum port located near die face), with enough distributive and dispersive mixing elements to produce good mixing between the components of the polymer compositions. The compositions were subsequently molded according to ISO 294 on a Husky or BOY injection-molding machine. Compositions were compounded and molded at a temperature of 270 to 330° C., although it will be recognized by one skilled in the art that the method is not limited to these temperatures.

Ranges articulated within this disclosure, e.g. numerics/values, shall include disclosure for possession purposes and claim purposes of the individual points within the range, sub-ranges, and combinations thereof.

Various combinations of elements of this disclosure are encompassed by this invention, e.g. combinations of elements from dependent claims that depend upon the same independent claim.

The invention is further illustrated by the following non-limiting examples.

Examples

A1. Testing Procedure & Description of Testing Components

Different composition of flame-retarded additives and PC are mixed together and pre-blended. Extrusion and molding is carried out under normal polycarbonate processing condition.

Flammability testing was conducted using the standard Underwriters Laboratory UL 94 test method (7 day conditioning), except that 20 bars rather than the usual 5 bars were tested. Specimens are to be preconditioned in an air-circulating oven for 168 hours at 70+/−1° C. and then cooled in the desiccator for at least 4 hours at room temperature, prior to testing. Once removed from the desiccator, specimens shall be tested within 30 minutes. The data was analyzed by calculation of the average flame out time, standard deviation of the flame out time and the total number of drips. Statistical methods were used to convert the data to a probability that a specific formulation would achieve a first time V0 pass or "p(FTP)" in the standard UL 94 testing of 5 bars. Preferably p(FTP) values will be 1 or very close to 1 for high confidence that a sample formulation would achieve a V0 rating in UL 94 testing. A p(FTP) value below 0.85 for a sample formulation was considered too low to predict a UL 94 rating of V0 for that formulation.

Peak Melt Viscosity values on resin samples were obtained on a dynamic rheometer using a Rheometrics ARES with a parallel plate fixture at a heating rate at 10° C./min at a frequency of 3 rad/s and strain amplitude of 9% and heated by hot air. The Peak Melt Viscosity was determined from a graph of the melt viscosity change as a function of temperature during the rheometric test. The highest absolute melt viscosity value (in Poise) on the graph between the temperatures of 350° C. (after polymer softening) to 450° C. (before polymer degradation) was defined as the Peak Melt Viscosity (see FIG. 1).

Molecular Weight values were by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min using methylene chloride as the solvent.

Flammability tests were performed following the procedure of Underwriter's Laboratory Bulletin 94 entitled "Tests for Flammability of Plastic Materials, UL94." Several ratings can be applied based on the rate of burning, time to extinguish, ability to resist dripping, and whether or not drips are burning. According to this procedure, materials can be classified as UL94 HB, V0, V1, V2, on the basis of the test results obtained for five samples. The criteria for each of these flammability classifications are described below. HB: In a 5-inch sample, placed so that the long axis of the sample is horizontal to the flame, the rate of burn of the sample is less than 3 inches per minute, and the flame is extinguished before 4 inches of sample are burned.

V0: In a sample placed so that its long axis is 180 degrees to the flame, the average period of flaming and/or smoldering after removing the igniting flame does not exceed ten seconds and none of the vertically placed samples produces drips of burning particles that ignite absorbent cotton. Five bar flame out time (FOT) is the sum of the flame out time for five bars, each lit twice for a maximum flame out time of 50 seconds.

V1: In a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

V2: In a sample placed so that its long axis is 180 degrees to the flame, the average period of flaming and/or smoldering after removing the igniting flame does not exceed twenty-five seconds, but the vertically placed samples produce drips of burning particles that ignite cotton. Five bar flame out time is the sum of the flame out time for five bars, each lit twice for a maximum flame out time of 250 seconds.

B1. General Method for Preparing Polycarbonate Samples with High Branching Contents and Different End Capping Agents The experimental method described below illustrates the procedure for making a polycarbonate containing approximately 1% THPE branching level and using methyl-p-hydroxybenzoate as the end-capping agent.

The following were added into a 70 L CSTR (continuous stirred reactor) equipped with an overhead condenser and a recirculation pump with a flow rate of 40 L/minute: (a) 4,4-bis-(hydroxyphenyl)-2,2-propane (BPA) (4500 g, 19.73 mol); (b) methyl p-hydroxybenzoate (135 g, 0.89 mol); 1,1,1-tris(4-hydroxyphenyl)ethane (THPE, 63 g, 0.2 mol); (c) triethylamine (20 mL, 0.197 mol); (d) methylene chloride (24.3 L); (e) de-ionized water (10.7 L), and (f) sodium gluconate (10 g). The reaction was allowed to stir for 10 minutes and the pH was maintained between 8 and 9 by the addition of 30 wt. % NaOH solution. The mixture was charged with phosgene (2708.1 g, 80 g/min, 27.37 mol). During the addition of phosgene, base (30 wt. % NaOH in deionized water) was simultaneously charged to the reactor to maintain the pH of the reaction between 9 and 10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. The Mw of the polycarbonate was measured to be 47,428 g/mol (referenced to polycarbonate standards).

In similar manner branched polycarbonates were made using other branching levels, other end-capping agents and with various molecular weights. The experimental details for the polymers described herein are listed in Table 1 below.

In Table 2 below the melt viscosity peak properties and the flame performance (expressed both as p(FTP) values and actual UL94 test results) for polymers PC-1 through PC-9 from Table 1 are listed. The peak melt viscosity values reported as "melt viscosity peak" in Table 2 were obtained on dried polycarbonate powders while the p(FTP) and V0 results were obtained on molded polycarbonate bars molded from formulations containing the polycarbonate powders PC-1 to PC-9, a phosphite heat stabilizer (0.06 wt. %) and a hindered amine light stabilizer (0.08 wt. %) and an FR package consisting of Rimar Salt, potassium perfluorobutane sulfonate (0.08 wt. %) and octaphenylcyclotetrasiloxane (0.05 wt. %) based on the weight of polycarbonate of 100 wt. %.

TABLE 2

| Properties | PC-1 | PC-2 | PC-3 | PC-4 | PC-5 | PC-6 | PC-7 | PC-8 | PC-9 |
| --- | --- | --- | --- | --- | --- | --- | --- | --- | --- |
| p (FTP) at 1.5 mm | 0.93 | 0.99 | 0.93 | 0.88 | 0.96 | 0.97 | 0.99 | 0.99 | 0.99 |
| p (FTP) at 1.2 mm | — | — | — | — | 0.15 | 0.56 | 0.99 | 0.99 | 0 |
| UL rating at 1.5 mm | V0 | V0 | V0 | V0 | V0 | V0 | V0 | V0 | — |
| UL rating at 1.0 mm | — | — | — | — | none | none | V0 | V0 | — |
| Molecular weight, g/mol | 47428 | 37165 | 30283 | 29376 | 41680 | 41701 | 50299 | 54843 | 50599 |
| Melt Viscosity Peak (Poise) | 18234 | 17712 | 8606 | 8159 | 20622 | 20705 | 27172 | 25692 | 20570 |
| Melt Viscosity Peak - Model (Poise) | 20048 | 16490 | 7564 | 7081 | 21090 | 18910 | 25959 | 25562 | 21683 |

Molded articles from PC-1 through PC-9 showed excellent V0 performance at 1.5 mm A linear polycarbonate control having no branching and a phenol end-cap and having a MW value of 25,139 and Peak Melt Viscosity value of only 6,142 failed the UL 94 V0 test and was only rated V1 at 1.5 mm.

Differentiation among the polycarbonates was observed when molded articles from PC-5 through PC-9 were tested at 1.0 mm PC-7 and PC-8 failed V0 testing and with p(FTP) values well below 0.9 at 1.0 mm while PC-8 and PC-9 passed at 1.0 mm with p(FTP) values at 0.99. PC-8 and PC-9 had higher MWs (<47,000 vs. >55,000) and higher peak melt viscosities (<22,000 poise vs. >25,000 poise) than PC-7 and PC-8.

C1. Peak Melt Viscosity Predicting Equation

In order to help design polycarbonates that would consistently pass the UL 94 V0 test at thin wall thicknesses a predictive tool was needed. Based on the melt viscosity peaks (in poise) from 35 different polycarbonates (and 2 replicates) differing in MW, % branching agent and end-capping agent types differing in pKa value (p-cyanophenol,

TABLE 1

| Components | PC-1 | PC-2 | PC-3 | PC-4 | PC-5 | PC-6 | PC-7 | PC-8 | PC-9 |
| --- | --- | --- | --- | --- | --- | --- | --- | --- | --- |
| Bisphenol A, g | 4500 | 4500 | 4500 | 4500 | 4500 | 4500 | 4500 | 4500 | 4500 |
| Endcap, g | MHB, 135 | Ph, 129.9 | TBP, 159.5 | MP, 130 | PCP, 225 | Ph, 120.6 | Ph, 168 | TBP, 251 | TBP, 177.6 |
| Sodium gluconate, g | 10 | 10 | 10 | 10 | 10 | 10 | 10 | 10 | 10 |
| Triethylamine, mL | 42 | 42 | 42 | 42 | 42 | 42 | 42 | 42 | 42 |
| Phosgene, g | 2404 | 2405 | 2504 | 2506.3 | 2608 | 2407 | 2508 | 2404 | 2406 |
| Tris(hydroxyphenyl)ethane, g | 63 | 129.1 | 64 | 64 | 167.4 | 128.5 | 196 | 196 | 126 |
| Tris(hydroxyphenyl)ethane, mol % | 0.97 | 1.99 | 0.99 | 0.99 | 2.58 | 1.98 | 3.02 | 3.02 | 1.94 |
| Water, L | 10 | 10 | 10.6 | 10.9 | 10.5 | 10 | 10 | 10.6 | 10.2 |
| Methylene chloride, L | 23 | 23 | 24.3 | 24.6 | 24.4 | 23 | 23 | 24.4 | 24.5 |
| Molecular weight, g/mol | 47428 | 37165 | 30283 | 29376 | 41680 | 41701 | 50299 | 54843 | 50599 | methyl-p-hydroxybenzoate, phenol, p-methoxyphenol, p-t-butylphenol, and p-cumylphenol) a polynomial equation that provided a model fit to the peak melt viscosity data was obtained (Design-Expert® version 7.0.3 from Stat-Ease, Inc.). The parameters in the equation included the branching level, BL (based on the total moles of branching agent/total moles of the bisphenol), the MW of the polycarbonate containing the end-capping agent and branching agent (measured by GPC using polycarbonate standards) and the pKa of the end-capping agent. The equation is shown below:

$$\text{Peak Melt Viscosity} = -57135.91 + 36961.39*BL + 14001.13*MW^{1/3} - 46944.24*pKa - 322.51*BL*MW^{1/3} - 2669.19*BL*pKa + 215.83*MW^{1/3}*pKa + 1125.63*BL^2 - 200.11*MW^{2/3} + 2231.15*pKa^2$$

*pKa values for all of the end-capping agents but p-t-butyl phenol and p-cumylphenol were obtained from the following reference: J. AM. CHEM. SOC. 2002, 6424. The values chosen in the reference were listed in the S7 category in Table 3 of the reference. The pKa value for p-t-butylphenol was obtained from the following reference: Journal of Molecular Structure: THEOCHEM 805, 2006, 31. The pKa for methyl-p-hydroxybenzoate was obtained from the following reference: Chromatographia Vol. 39, No. 5/6, September 1994. The pKa value for p-cumylphenol was approximated based on the values of similar structures.

The model characteristics are shown in Table 3 below:

TABLE 3

| Model Characteristics | |
|---|---|
| R-Squared | 0.87 |
| Adjusted R-Squared | 0.82 |
| Predicted R-Squared | 0.70 |
| Adequate Precision | 14.34 |

The "Predicted R-Squared" of 0.70 is in reasonable agreement with the "Adjusted R-Squared" of 0.82. "Adequate Precision" measures the signal to noise ratio. A ratio greater than 4 is generally desirable. Here, the ratio of 14.34 indicates an adequate signal and thus this model can be used to navigate the design space.

The pKa values used in the model for the end-capping agents are listed in Table 4 below:

TABLE 4

| End-Capping Agent | pKa* |
|---|---|
| p-cyanophenol | 8.2 |
| p-methyl-hydroxy benzoate | 8.4 |
| phenol | 9.9 |
| p-t-butylphenol | 10.2 |
| p-methoxyphenol | 10.4 |
| p-cumylphenol | 10.5 |

The model then was used to recalculate the peak melt viscosity values identified as Melt Viscosity Peak—Model (poise) in Table 2. The correlations in general were excellent between the model and the actual Peak Viscosity values especially when the measured values exceeded 20,000 poise. Above 20,000 poise the difference between the measured and calculated melt viscosity values was consistently less than 10%

The calculated melt viscosity peak measurements were surprisingly effective at predicting the p(FTP) and V0 performance of polycarbonates PC-5, PC-6, PC-7 and PC-8 at a thickness of 1.0 mm Polycarbonates having Peak Melt Viscosity calculated values or measured below about 25,000 poise failed the V0 test at 1.0 mm and had p(FTP) values below 0.9 as illustrated (PC-5 and PC-6) whereas polycarbonates having Peak Melt Viscosity values measured or calculated values greater than about 25,000 passed the V0 test at 1.0 mm and had p(FTP) values of 0.99 (PC-7 and PC-8).

D1. Blends with High Peak Viscosity Polycarbonates

Polycarbonates PC-10, PC-11 and PC-12 made with 3% THPE branching levels and the end-capping agents phenol, methyl-p-hydroxybenzoate and p-cumylphenol respectively were prepared using the method described above. Based on the wt. % THPE levels, the pKas of the end-capping agents and MWs of the polycarbonates, the calculated values from the equation above for the Peak Melt Viscosities were 22,960 (PC10), 25,683 (PC-11) and 12,527 (PC12). Blend formulations with high flow polycarbonate (made by an interfacial process and having p-cumylphenol end-capping agents with an average MW of 22,000 g/mol and an MVR of 25) were extruded with PC10, PC-11 and PC12. The blend formulations, MVR values of the resultant blends for and the flame properties of the blends are listed in Table 5 below.

TABLE 5

| Components | | | | MW | PMV (calculated) |
|---|---|---|---|---|---|
| PC-10, wt. % | 50 | | | 35526 | 22960 |
| PC-11, wt. % | | 50 | | 41167 | 25683 |
| PC-12, wt. % | | | 50 | 31458 | 12527 |
| High flow PC, wt. % | 50 | 50 | 50 | | |
| Octaphenyl-cyclotetrasiloxane, wt. %* | 0.5 | 0.5 | 0.5 | | |
| Rimar Salt, wt. %* | 0.8 | 0.8 | 0.8 | | |
| Heat stabilizers, wt. %* | 0.6 | 0.6 | 0.6 | | |
| Mold release, wt. %* | 0.27 | 0.27 | 0.27 | | |
| Properties | | | | | |
| MVR (300, 1.2 kg, 360 s) | 13.8 | 4.2 | 13.3 | | |
| p(FTP) (V0@1.5 mm/ 70° C. 168 Hr) | 0.97 | 0.99 | 0.2 | | |
| p(FTP) (V0@1.0 mm/ 70° C. 168 Hr) | 0 | 0 | 0 | | |
| UL 94 Rating @ 1.5 mm | V0 | V0 | none | | |

*wt. % from total amount of blended polycarbonate resins

The results from Table 5 illustrate the importance of making blends using a polycarbonate with a high peak melt viscosity value for applications requiring thin wall flame properties. PC-10 and PC-12 have very similar MWs (35,526 vs. 31,458 g/mol) and the blends compounded from them have very similar MVRs (13.8 vs. 13.3) but the two blends were compounded using polycarbonates (PC-10 and PC-12) having very different calculated Peak Melt Viscosities (22,960 vs. 12,527). This difference appears to result in a very different flame performance for the two blends, one passing the UL 94 V0 test at 1.5 mm (from PC-10 having a high calculated Peak Melt Viscosity of 22,960 and the other blend PC-12 failing UL 94 V0 testing at 1.5 mm from PC-12, having a low calculated Peak Melt Viscosity of 12,527).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

We claim:
1. A composition comprising:
a polycarbonate of the following formula

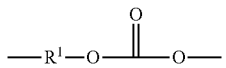

wherein at least 60 percent of the total number of $R^1$ groups contain aromatic groups and the balance thereof are aliphatic or alicyclic groups;
wherein the polycarbonate was formed in the presence of an end-capping agent and the end-capping agent is not cyanophenol;
wherein the polycarbonate has a branching level of at least about 2%;
wherein the polycarbonate has a weight average molecular weight of between about 20,000 g/mole to 54,843 g/mole as measured by gel permeation chromatography using polycarbonate standards; and
wherein the polycarbonate has a peak melt viscosity of at least 25,000 poise when measured using a parallel plate melt rheology test at a heating rate of 10° C./min at a temperature of between about 350° C. to about 450° C. at a frequency of 3 rad/s and strain amplitude of 9%; and
a flame retardant; and
a thermoplastic polymer that is different than the polycarbonate;
wherein a molded article of the polycarbonate and the flame retardant has a UL94 V0 rating at a thickness of 1.0 mm; and wherein a molded article of the composition has a UL94 V0 rating at a thickness of 1.5 mm.

2. The composition of claim 1, wherein the polycarbonate has a weight average molecular weight of between about 20,000 g/mole to about 40,000 g/mole as measured by gel permeation chromatography using polycarbonate standards.

3. The composition of claim 1, wherein the end-capping agent has a pKa between about 8.3 and about 11.

4. The composition of claim 1, wherein the end-capping agent is selected from at least one of the following: a phenol and a phenol containing one or more substitutions with at least one of the following: an aliphatic group, an olefinic group, an aromatic group, a halogen, an ester group, and an ether group.

5. The composition of claim 1, wherein the end-capping agent is selected from at least one of the following: phenol, p-t-butylphenol, and p-cumylphenol.

6. The composition of claim 1, wherein the polycarbonate of said composition has a branching level of at least about 3%.

7. The composition of claim 1, wherein the flame retardant comprises at least one of the following: alkali metal salts of perfluorinated $C_{1-16}$ alkyl sulfonates; potassium perfluorobutane sulfonate; potassium perfluoroctane sulfonate; tetraethylammonium perfluorohexane sulfonate; and potassium diphenylsulfone sulfonate.

8. The composition of claim 1, wherein the thermoplastic polymer is a second polycarbonate comprising a repeating structure of

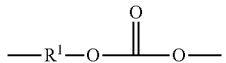

wherein the second polycarbonate is different from said polycarbonate, and wherein at least 60 percent of the total number of $R^1$ groups contain aromatic groups and the balance thereof are aliphatic or alicyclic groups; and
wherein at least a portion of the $R^1$ groups are derived from bisphenol-A.

9. The composition of claim 1, wherein the composition has a haze value of less than 1.5% at 3.2 mm thickness by ASTM D1003.

10. The composition of claim 1, wherein the polycarbonate is derived from bisphenol-A.

11. The composition of claim 1, wherein the thermoplastic polymer is a second polycarbonate derived from bisphenol-A.

12. The composition of claim 1, wherein the polycarbonate is selected from at least one of the following: a homopolycarbonate derived from a bisphenol; a copolycarbonate derived from more than one bisphenol; and a copolymer derived from one or more bisphenols and comprising one or more aliphatic ester units, aromatic ester units, and siloxane units.

13. The composition of claim 1, wherein the thermoplastic polymer comprises at least one of polyester, polyamide, polysiloxane, polycarbonate, and a copolymer comprising at least one of the foregoing.

14. The composition of claim 1, wherein the thermoplastic polymer is a polycarbonate copolymer selected from polycarbonate-polysiloxane copolymers, and polyester-polycarbonates.

15. The composition of claim 1, wherein the thermoplastic polymer comprises copolycarbonate-polyester-polysiloxane terpolymer.

16. An article comprising the composition of claim 1.

17. A composition comprising:
a first polycarbonate of the following formula

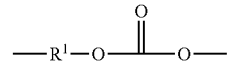

wherein at least 60 percent of the total number of $R^1$ groups contain aromatic groups and the balance thereof are aliphatic or alicyclic groups;
wherein the first polycarbonate was formed in the presence of an end-capping agent and the end-capping agent is not cyanophenol;
wherein the first polycarbonate has a branching level of at least about 2%;
wherein the first polycarbonate has a weight average molecular weight of 20,000 g/mole to 54,843 g/mole as measured by gel permeation chromatography using polycarbonate standards; and
wherein the first polycarbonate has a peak melt viscosity of at least 8,000 poise when measured using a parallel plate melt rheology test at a heating rate of 10° C./min at a temperature of between about 350° C. to about 450° C. at a frequency of 3 rad/s and strain amplitude of 9%; and
a flame retardant; and
a second polycarbonate derived from at least bisphenol-A, wherein the second polycarbonate is different from the first polycarbonate;
wherein a molded article of the polycarbonate and the flame retardant has a UL94 V0 rating at a thickness of 1.0 mm; and wherein a molded article of the composition has a UL94 V0 rating at a thickness of 1.5 mm.

18. The composition of claim 17, wherein the peak melt viscosity is at least 22,960 poise.

19. The composition of claim 17, wherein the first polycarbonate of said composition has a branching level of at least about 3%.

* * * * *